May 3, 1960 M. FERYSZKA 2,935,555

MODULATOR FOR COLOR TELEVISION TRANSMITTERS

Filed Oct. 6, 1954 2 Sheets-Sheet 1

INVENTOR.
MAX FERYSZKA
BY [signature]
AGENT

MODULATOR FOR COLOR TELEVISION TRANSMITTERS

Filed Oct. 6, 1954 2 Sheets-Sheet 2

INVENTOR.
MAX FERYSZKA
BY F.A. Rechif
AGENT 2,935,555

MODULATOR FOR COLOR TELEVISION TRANSMITTERS

Max Feryszka, Haddonfield, N.J., assignor to Radio Corporation of America, a corporation of Delaware Application October 6, 1954, Serial No. 460,705

13 Claims. (Cl. 178—5.4)

This invention relates to a modulator circuit, and more particularly to such a circuit useful in color television transmitters.

In some television transmitters, the composite video signal is applied from the output of the modulator to the grid of the modulated stage, the radio frequency driving voltage (carrier) being also applied to this grid, so that the magnitude of the carrier frequency anode current in the modulated stage varies linearly with the magnitude of the applied video signal.

In color television, the composite video signal contains not only brightness or luminance information, but also the chrominance information in the form of a subcarrier which is varied in phase and amplitude as a function of hue and saturation of colors. In color television systems now in operation the frequency of this subcarrier is of the order of 3.579 megacycles. This chrominance information (subcarrier) is superimposed on the brightness information. It is very important to maintain the characteristics of phase and amplitude of the subcarrier superimposed on different brightness levels of transmitted signal exactly the same as these are in the signal coming in to the transmitter, since every variation in the phase of the subcarrier in the transmitted signal with respect to the signal coming in to the transmitter will result in distortion of the hue (color).

For the subcarrier frequency, the output impedance of the modulator is complex, being equivalent to a resistor and capacitor in parallel. The grid current in the modulated stage differs for different brightness levels, so that the total resistive component of the modulator output impedance in effect changes with a change in the brightness signal level. Thus, the equivalent complex impedance of the modulator output is variable with the brightness signal level. Variations in the modulator output impedance (for the subcarrier frequency) will result, in general, in phase and amplitude distortion of the subcarrier, producing undesired distortion in the chrominance information. In other words, variations in brightness or D.C. signal levels cause changes in the effective impedance of the output circuit of the modulator, thereby introducing undesirable changes in phase of the subcarrier. The latter cause distortion in hue in the ultimate reproduced picture.

An object of this invention is to provide an arrangement, in a modulator for a color television transmitter, for maintaining the phase of the color subcarrier independent of brightness or D.C. signal level.

Another object is to provide a novel phase correcting network for a modulator output circuit.

Yet another object is to provide an arrangement for passing a signal through a variable complex impedance and changing the impedance in such a way that changes in phase of the signal by the impedance are minimized.

A further object is to provide an arrangement for counteracting changes, in the resistive component of a variable complex impedance, which tend to be produced as a result of changes in the signal level applied to such impedance.

A still further object is to provide an arrangement for counteracting changes, in the reactive component of a variable complex impedance, which tend to be produced as a result of changes in the signal level applied to such impedance.

A further object is to prevent distortion of the chrominance information in a color television transmitter as a result of a change in the brightness D.C. signal level.

The objects of this invention are accomplished, briefly, in the following manner: In a first embodiment, a pair of resistors are connected to the modulator output circuit by means of separate respective diodes which are suitably differently biased to conduct at certain signal levels, thus introducing a variable resistor so that the total resistive component of the modulator output impedance, and therefore its phase angle at the subcarrier frequency, is constant over a wide range of brightness signal levels. In another embodiment, a pair of capacitors are connected to the modulator output circuit by means of separate diodes differently biased, thus introducing a variable reactive component so that the phase angle of the modulator output impedance, as measured at the subcarrier frequency, is constant over a wide range of brightness signal levels.

The invention will be better understood from the following description of some exemplifications thereof, reference being had to the accompanying drawings, wherein.

Figure 1:
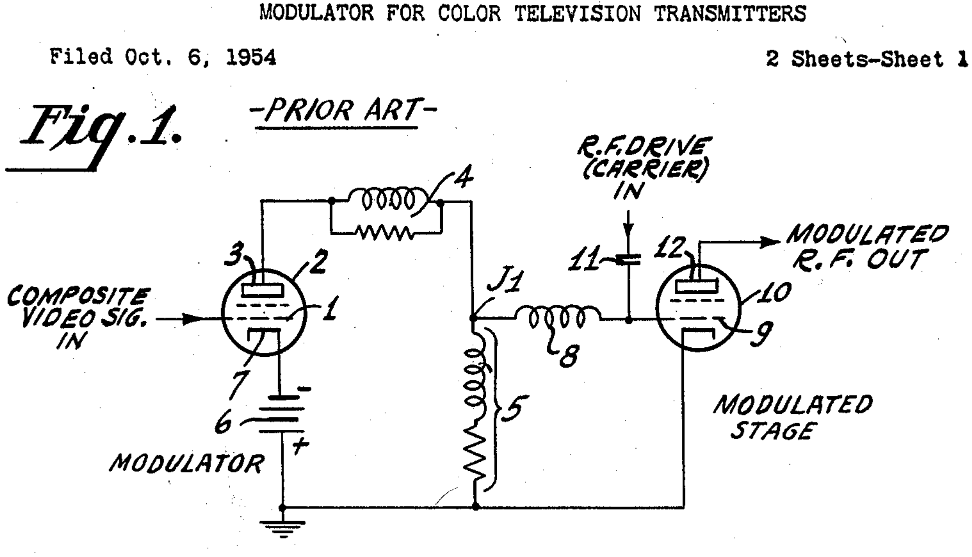
Fig. 1 is a simplified schematic diagram of a typical modulator and modulated stage of the prior art.
Figure 3:
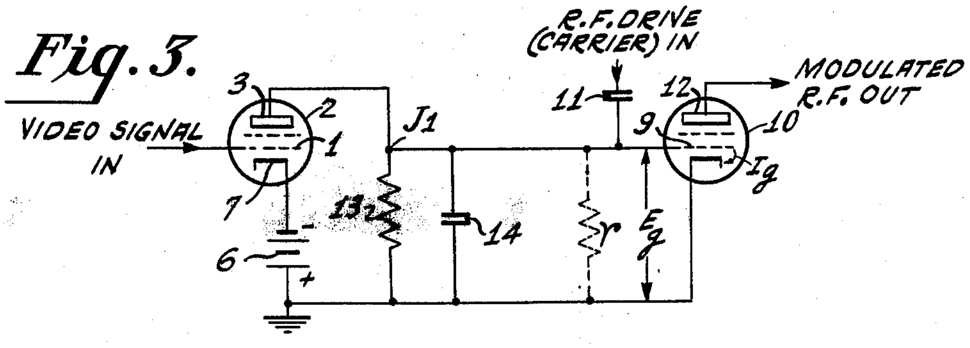
Figure 4:
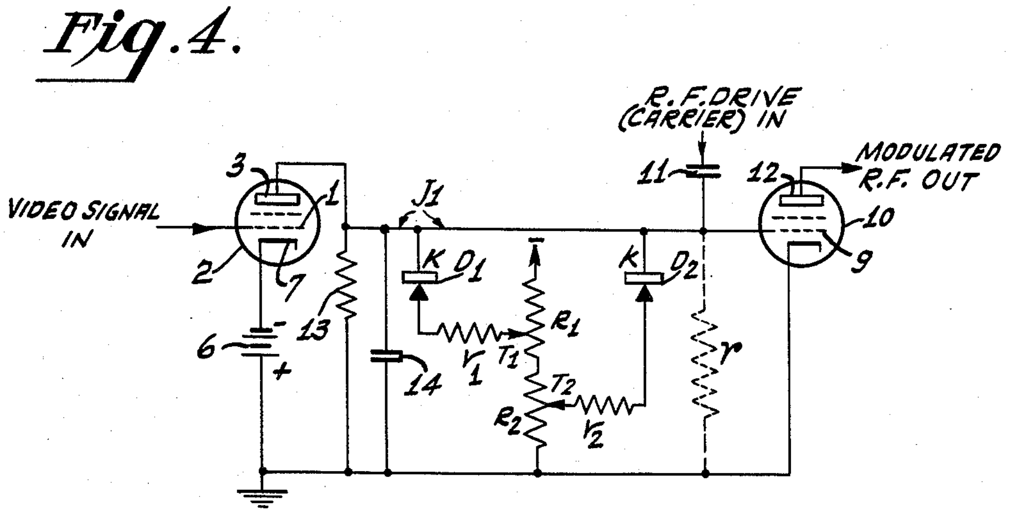
Figure 5:
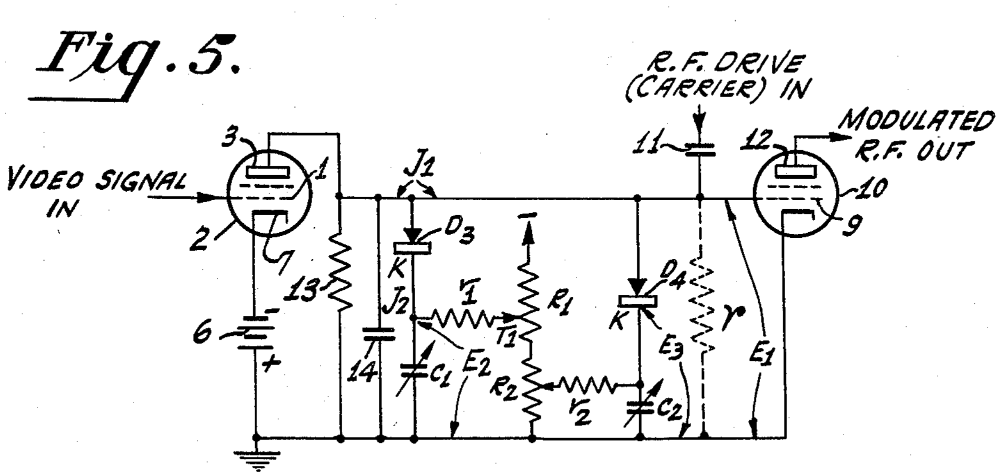

Fig. 3 is an equivalent circuit for Fig. 1, under the condition of high radio frequency output representing a black video signal or signal of low brightness; and Figs. 4 and 5 are diagrams of equivalent circuits similar to Fig. 3 but illustrating two different embodiments of the invention, Fig. 4 indicating the manner in which resistance is added and removed and Fig. 5 indicating the manner in which capacitance is added and removed.

Referring now to the drawings, Fig. 1 illustrates, in simplified form, a typical modulator stage and grid modulated stage of the prior art. The composite video signal, which for a color television transmitter includes among other things brightness and chrominance information, is fed to control grid 1 of the evacuated tetrode 2 which is the modulator tube. The anode 3 of modulator tube 1 is connected through a parallel resistance-inductance network 4 and a series resistance-inductance network 5 to ground and to the positive terminal of the unidirectional potential source 6, the negative terminal of which is connected to the cathode 7 of the modulator. Networks 4 and 5 are series and shunt peaking networks to improve the gain-bandwidth characteristics of the modulator stage. The amplified composite video signal is taken off from the junction J1 between networks 4 and 5, in the anode circuit of modulator tube 2, and is fed through an inductance 8 to the control grid 9 of an evacuated tetrode 10 (which is the modulated stage). Inductance 8 is a radio frequency choke. Grid modulation of the carrier which is supplied from a suitable source of radio frequency energy through a capacitor 11 to grid 9. In the modulated stage 10 described, amplitude modulation of the radio frequency carrier takes place, and the magnitude of the carrier frequency current at the anode 12 of tube 10 varies linearly with the magnitude of the video signal fed to grid 9. The amplitude modulated radio frequency energy is taken off from anode 12 and applied therefrom to any suitable output circuit such as an antenna.

Figure 2:
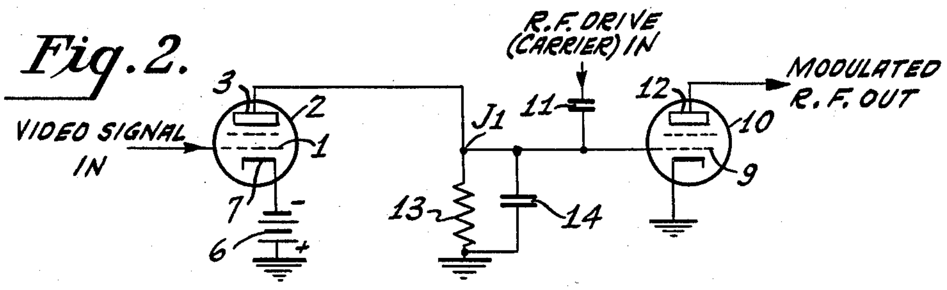
Fig. 2 is an equivalent circuit for Fig. 1, at the subcarrier frequency, under the condition of low radio frequency output representing a video signal of high brightness.

For the subcarrier frequency (about 3.579 mc. according to present standards), the output impedance of the modulator (including the elements 4, 5 and 8) is complex. The equivalent output impedance of the modulator (for the color subcarrier frequency) is a resistor in parallel with a capacitor. The equivalent circuit for Fig. 1 is represented in Fig. 2, wherein elements the same as those of Fig. 1 are represented by the same reference numerals. In Fig. 2, equivalent complex output impedance of the modulator 2 at the subcarrier frequency is represented by resistor 13 in parallel with capacitor 14.

Referring back to Fig. 1, on the grid 9 of modulated stage 10, there is a fixed radio frequency drive from the radio frequency energy source via the connection labeled "RF drive (carrier) in" and the composite video signal from the anode 3 of modulator tube 2. For a low level of brightness signal (black or near-black picture being transmitted) applied to modulator 2 grid current will flow in tube 10, due to the small level of resultant negative bias on the grid 9 under these conditions. In other words, a black-level signal applied to grid 1 of modulator tube 2 (black-level signal being a negative-going signal) will substantially reduce anode current flow through tube 2, causing the voltage at junction J1 to rise. As a consequence, the negative grid bias on the grid 9 of modulated stage tube 10 will be reduced, resulting in a large radio frequency output at the anode 12 of tube 10. Also, because of the reduced negative bias on grid 9, the grid-to-cathode resistance is effectively reduced, as will be explained more fully later.

Conversely, a white or bright signal applied to grid 1 of tube 2 (white signal being a positive-going signal) will cause a relatively large anode current flow through resistor 13 (which is in the anode circuit of tube 2), causing a reduction in voltage at junction J1. This results in a relatively high negative voltage on grid 9 of tube 10, and a reduction in the radio frequency output to be derived from anode 12 of tube 10. Also, as a result of this action wherein grid 9 is subjected to higher negative voltage, the effective grid-to-cathode resistance for tube 10 will be increased and grid current flow will be reduced. If a color subcarrier is superimposed on a low level brightness (black-level) signal axis the grid current of tube 10 will vary, in phase with this subcarrier. This is equivalent to an additional resistor $$r=\frac{dE_g}{dI_g} \qquad (1)$$

in parallel with the equivalent RC network in the output of the modulator 2, where $E_g$ stands for the grid voltage and $I_g$ for the grid current. The resistor $r$ may be thought of as the equivalent resistive component of the input impedance for the tube 10.

Fig. 3 represents the equivalent circuit for Fig. 1, with a low level of brightness signal applied to grid 1 of tube 2, and illustrates the additional resistor $r$ just referred to.

For Fig. 3, the modulator output impedance $Z_1$ is $$\frac{Rr}{R+r}\Big/1+j\frac{Rr}{R+r}\omega C \qquad (2)$$

Where R stands for the resistance of resistor 13 $\omega$ is $2\pi$ times the frequency of the chrominance subcarrier, and C stands for the capacitance of capacitor 14. The output impedance phase angle $\phi_1$ is $$\tan \phi_1=-\omega C\frac{Rr}{R+r} \qquad (3)$$

For a high level of brightness signal (white or near-white picture being transmitted) applied to the modulator 2 no grid current will flow in tube 10, due to the high level of bias on the grid 9 under these conditions. That is, a white signal causes large anode current to flow in tube 2, causing the voltage on anode 3 to drop and causing, in effect, high negative bias to be applied to grid 9 of tube 10. So, for a color subcarrier superimposed on this high level brightness axis the additional resistor $r$ in parallel with the RC network in the output of modulator 2, will not exist. Then, the equivalent circuit for Fig. 1, with a high level of brightness signal applied, will be that illustrated in Fig. 2. In this case, the modulator output impedance $Z_2$ is $$\frac{R}{1+jR\omega C} \qquad (4)$$

where the symbols have the same meaning as in Equation 2. The output impedance phase angle $\phi_2$ is $$\tan \phi_2=-\omega CR \qquad (5)$$

Comparing Figs. 2 and 3, one of which (Fig. 3) is the equivalent circuit for the modulator output with a low level of brightness signal applied to modulator 2, and the other of which (Fig. 2) is the equivalent circuit for the modulator output with a high level of brightness signal applied to modulator 2, it may be seen that the equivalent complex impedance of the modulator output is variable with brightness or D.C. video signal level. In other words, the resistor $r$ (which forms a part of the modulator output impedance) varies with the brightness signal level. Variations of the modulator output impedance (for the color subcarrier frequency) as a function of brightness signal level will therefore result, in general, in phase and amplitude distortion of the color subcarrier, since this subcarrier is applied to the variable complex impedance of the modulator output. Thus, in general, the phase and amplitude of the color subcarrier superimposed on different brightness levels of transmitted signal will not be exactly the same as these are in the signal coming in to the transmitter. Every variation in phase of the color subcarrier in the outgoing signal with respect to the incoming signal will result in distortion of the hue (color).

Another way of explaining the action in Figs. 2 and 3 is as follows. With grid bias modulation as illustrated, the bias applied to grid 9 is always negative. For black level the bias is nearly equal to the cutoff bias (small negative voltage), and the bias increases in absolute negative value toward white level. On the same grid 9 there is both the bias voltage and a fixed RF drive, so that for black level (small negative bias) the grid may have a positive potential with respect to the cathode of tube 10 during some portion of the RF cycle, resulting in a pulsating grid current. This pulsating grid current is equivalent to the sum of a certain value of D.C. grid current, plus fundamental frequency and harmonic frequency currents. The D.C. grid current will load the modulator output differently for different brightness levels.

According to the present invention, now to be described, the phase of the color subcarrier is made independent of the brightness signal level. Although both phase and amplitude distortion of the color subcarrier may result from the action previously described, the more important of these two types of distortion is the phase distortion, since the hue depends on the phase of the color subcarrier.

In the first embodiment of the invention, a variable resistor is in effect introduced into the modulator output so that the total resistive component of the modulator output impedance is constant over a wide range of brightness signal levels, thus causing the phase angle of this impedance to be constant also over this wide range. Referring to Fig. 4, which illustrates this embodiment and which is an equivalent circuit similar to Fig. 3 but including the invention, one end of a resistor $r_1$ is connected through a diode $D_1$ to the junction J1. This junction is at the upper or ungrounded end of resistor 13 and capacitor 14. The opposite end of resistor $r_1$ is connected to the movable tap T1 on a potentiometer $R_1$. One end of $R_1$ is connected to a suitable source of negative potential denoted by a minus sign and the other end of R1 is connected to one end of a second potentiometer $R_2$, the opposite end of $R_2$ being grounded. In this way, the potentiometers $R_1$ and $R_2$ are connected in series between the negative potential source and ground and different negative voltages are available at the respective movable taps T1 and T2 respectively of potentiometers $R_1$ and $R_2$.

The diode $D_1$ has its cathode K connected to control grid 9 and its anode connected to resistor $r_1$, and its anode is biased negatively by the arrangement including potentiometer $R_1$. Thus, the diode $D_1$ is arranged to conduct at a certain brightness level toward white level, that is, at a high level of bias or high negative brightness signal voltage on grid 9. The setting of potentiometer $R_1$ determines the brightness signal level when diode $D_1$ starts to conduct.

Similarly, one end of a resistor $r_2$ is connected through a diode $D_2$ to the common junction J1 of anode 3 and control grid 9. The opposite end of resistor $r_2$ is connected to the movable tap T2 on potentiometer $R_2$. The diode $D_2$ has its cathode K connected to control grid 9 and its anode connected to resistor $r_2$, and its anode is biased negatively by the arrangement including potentiometer $R_2$. The diode $D_2$ is arranged to conduct at a certain brightness level toward white level (different from the level at which $D_1$ conducts), that is, at a high level of bias or high negative brightness signal voltage on grid 9. The setting of potentiometer $R_2$ determines the brightness signal level when diode $D_2$ starts to conduct.

As previously described in connection with Fig. 3, the effective loading resistance $r$ is variable with brightness signal level, decreasing toward black level because of the increasing grid current in tube 10 toward black level, see Equation 1. When the diode $D_1$ conducts, the resistor $r_1$ is connected into the circuit in parallel with resistor $r$, and when the diode $D_2$ conducts the resistor $r_2$ is connected into the circuit in parallel with resistor $r$. Thus, the resistors $r_1$ and/or $r_2$ are variably introduced into the modulator output circuit by means of diodes $D_1$ and/or $D_2$. The diodes $D_1$ and $D_2$ start to conduct at certain different brightness levels toward white level, introducing the resistors $r_1$ or $r_2$ into the circuit in parallel with resistor $r$ and with decreasing effective resistance toward white level. The resistance of the equivalent loading resistor $r$ in effect decreases in value for black-level signals and increases in value for white-level signals. Resistors $r_1$ and $r_2$, in combination with the equivalent variable resistor $r$, of value $dE_g/dI_g$, thus give a resultant or effective resistance (in the modulator output circuit) which is substantially constant for all levels of brightness. The two diodes $D_1$ and $D_2$, which start to conduct at different brightness levels, thus counteract or compensate (by means of resistors $r_1$ and $r_2$) the variations of variable resistor $r$ (the grid-cathode resistance of tube 10) so that the total output impedance of the modulator 2 is constant in magnitude and in phase angle and is independent of the brightness signal level.

In the second embodiment of the invention, a variable reactance is in effect introduced into the modulator output so that the phase angle of the modulator output impedance is constant over a wide range of brightness signal levels. Referring to Fig. 5, which illustrates this embodiment and which is also an equivalent circuit similar to Fig. 3 but including the invention, one terminal of an adjustable capacitor $C_1$ is connected through a diode $D_3$ to the common junction J1 of anode 3 and control grid 9, that is, to the upper or ungrounded end of resistor 13 and capacitor 14. The opposite terminal of $C_1$ is connected to ground. Diode $D_3$ has its anode connected to control grid 9 and its cathode K connected to capacitor $C_1$. The common junction J2 of diode $D_3$ and capacitor $C_1$ is connected through a resistor $r_1$ to the movable tap T1 on potentiometer $R_1$ one end of which is connected to a suitable source of negative potential denoted by a minus sign and the other end of which is connected to one end of a second potentiometer $R_2$, the opposite end of $R_2$ being grounded. Potentiometers $R_1$ and $R_2$ are connected in series between the negative potential source and ground, and different negative voltages are available at the respective movable taps T1 and T2 of potentiometers $R_1$ and $R_2$. The cathode K of diode $D_3$ is thus biased negatively by the arrangement including the negative potential source and potentiometer $R_1$.

Diode $D_3$ is arranged to conduct at a certain brightness level toward black level, that is, at a low level of bias or small negative brightness signal voltage on grid 9. The setting of tap T1 on potentiometer $R_1$ determines the brightness signal level when diode $D_3$ starts to conduct. The voltage between the anode and cathode of diode $D_3$ is the difference between $E_1$, the brightness signal voltage on grid 9 (effective on the anode of diode $D_3$) and $E_2$, the negative bias voltage applied to the cathode of diode $D_3$ by way of potentiometer $R_1$. The diode $D_3$ will conduct so long as the absolute value of $E_1$ is less than the absolute value of $E_2$, that is, for small negative brightness signal voltages on grid 9.

Similarly, one terminal of an adjustable capacitor $C_2$ is connected through a diode $D_4$ to the common junction J1 of anode 3 and control grid 9. The opposite terminal of $C_2$ is connected to ground. Diode $D_4$ has its anode connected to control grid 9 and its cathode K connected to capacitor $C_2$. The common junction J3 of diode $D_4$ and capacitor $C_2$ is connected through resistor $r_2$ to the movable tap T2 on potentiometer $R_2$. The cathode K of diode $D_4$ is biased negatively by the arrangement including potentiometer $R_2$, the negative potential source and potentiometer R1. Diode $D_4$ is arranged to conduct at a certain brightness level toward black level (different from the level at which $D_3$ conducts), that is, at a low level of bias or small negative brightness signal voltage on grid 9. The setting of tap T2 on potentiometer $R_2$ determines the brightness signal level when diode $D_4$ starts to conduct. Similarly to the conditions for diode $D_3$, the voltage between the anode and cathode of diode $D_4$ is the difference between $E_1$, the brightness signal voltage on grid 9 (effective on the anode of diode $D_4$) and $E_3$, the negative bias voltage applied to the cathode of diode $D_4$ by way of potentiometer $R_2$. The diode $D_4$ will conduct so long as the absolute value of $E_1$ is less than the absolute value of $E_3$, that is, for small negative brightness signal voltages on grid 9.

When the diode $D_3$ conducts the capacitor $C_1$ is connected into the circuit in parallel with capacitor 14, thus adding to the total capacitance in the modulator output circuit, and when the diode $D_4$ conducts the capacitor $C_2$ is connected into the circuit in parallel with capacitor 14, also adding to the total capacitance in the modulator output circuit.

The capacitors $C_1$ and/or $C_2$ are variably introduced into the modulator output circuit by means of diodes $D_3$ and/or $D_4$. Thus, a variable reactive component (variable because of the variable conduction of diodes $D_3$ and $D_4$) is introduced into the modulator output circuit in Fig. 5. The diodes $D_3$ and $D_4$ start to conduct at certain brightness levels toward black level, introducing the capacitors $C_1$ or $C_2$ into the circuit in parallel with capacitor 14. The reactive component thus variably introduced into the modulator output circuit causes the phase angle of the modulator output impedance, as measured at the subcarrier frequency, to be maintained constant for the different brightness levels. This may be realized from the following explanation.

In Fig. 5, the values of the resistors $r_1$ and $r_2$ are made such that they are each much greater than the value of resistor 13. Equation 3 gives an expression for the phase angle $\phi_1$ provided by the modulator output impedance for black level, with no compensation or correction according to this invention. This may be written as follows:

$$\phi_1=\tan^{-1}-\omega C\frac{Rr}{R+r} \qquad (6)$$

Equation 5 gives an expression for the phase angle $\phi_2$ provided by the modulator output impedance for white level, again with no compensation or correction according to this invention. This may be written as follows:

$$\phi_2=\tan^{-1}-\omega CR \quad (7)$$

In Equations 6 and 7, the symbols have the same meaning as previously explained in connection with Equation 2.

By introducing in black level (by means of the diodes $D_3$ or $D_4$ which start to conduct toward black level) an additional capacitor $\Delta C$ (capacitors $C_1$ and/or $C_2$ connected in parallel with capacitor 14 by means of the diodes), we can make the phase angle of the modulator output impedance constant for the different brightness levels, that is, we can make $\phi_1=\phi_2$. According to the embodiment of this invention illustrated in Fig. 5, the diodes $D_3$ or $D_4$ introduce the proper additional capacitor $\Delta C$, in black level. The value of this capacitor $\Delta C$ which must be introduced in black level by action of the diodes $D_3$ or $D_4$ may be determined as follows:

$$\phi_1=\tan^{-1}-\omega(C+\Delta C)\frac{Rr}{R+r}=\phi_2=\tan^{-1}-\omega CR$$

Simplifying, $$(C+\Delta C)\frac{r}{R+r}=C$$

or $$\Delta C\frac{r}{R+r}=C\frac{R}{R+r}$$

so that $$\Delta C=C\frac{R}{r}$$

Another way of looking at Fig. 5 is as follows. At black level, the total resistive component of the modulator output impedance decreases, as shown by Equation 6. Since the phase angle provided by the modulator output impedance is proportional to the total C times the total R, the total C is increased in black level to maintain the said phase angle constant, as the total resistive component decreases.

What is claimed is:

1. In combination, a modulator tube having an anode, a control electrode, and a cathode, a resistor and a source of anode potential connected in series between said anode and said cathode, the positive terminal of said source being connected to a point of reference potential, an electron discharge device having an anode, a control grid, and a cathode, said control grid being connected to the anode of the modulator tube, the cathode of said device being connected to the positive terminal of said source, increasing anode current flow through said modulator tube causing decreasing anode current flow through said device; the series combination of a diode and a resistor connected between the grid and cathode of said device, and a circuit for biasing said diode in such a way that said diode becomes conductive with an increase in anode current flow through said modulator tube.

2. In combination, a modulator tube having an anode, a control electrode, and a cathode, a resistor and a source of anode potential connected in series between said anode and said cathode, the positive terminal of said source being connected to a point of reference potential, an electron discharge device having an anode, a control grid, and a cathode, said control grid being connected to the anode of the modulator tube, the cathode of said device being connected to the positive terminal of said source, increasing anode current flow through said modulator tube causing decreasing anode current flow through said device; the series combination of a diode and a capacitor connected between the grid and cathode of said device, and a circuit for biasing said diode in such a way that said diode becomes conductive with a decrease in anode current flow through said modulator tube.

3. In combination, a modulator tube having an anode, a control electrode, and a cathode, a resistor and a source of anode potential connected in series between said anode and said cathode, the positive terminal of said source being connected to a point of reference potential, an electron discharge device having an anode, a control grid, and a cathode, said control grid being connected to the anode of the modulator tube, the cathode of said device being connected to the positive terminal of said source, increasing anode current flow through said modulator tube causing decreasing anode current flow through said device; the series combination of a unilateral conducting device and a resistor connected between the grid and cathode of said device, and a circuit for biasing said unilateral device in such a way that the same becomes conductive with an increase in anode current flow through said modulator tube.

4. In combination, a modulator tube having an anode, a control electrode, and a cathode, a resistor and a source of anode potential connected in series between said anode and said cathode, the positive terminal of said source being connected to a point of reference potential, an electron discharge device having an anode, a control grid, and a cathode, said control grid being connected to the anode of the modulator tube, the cathode of said device being connected to the positive terminal of said source, increasing anode current flow through said modulator tube causing decreasing anode current flow through said device; the series combination of a unilateral conducting device and a capacitor connected between the grid and cathode of said device, and a circuit for biasing unilateral device in such a way that the same becomes conductive with a decrease in anode current flow through said modulator tube.

5. In combination, a modulator tube having an anode, a control electrode, and a cathode, a resistor and a source of anode potential connected in series between said anode and said cathode, the positive terminal of said source being connected to a point of reference potential, an electron discharge device having an anode, a control grid, and a cathode, said control grid being connected to the anode of the modulator tube, the cathode of said device being connected to the positive terminal of said source, increasing anode current flow through said modulator tube causing decreasing anode current flow through said device; the series combination of a diode and a resistor connected between the grid and cathode of said device, and a circuit for biasing said diode in such a way that said diode becomes conductive with an increase in the negative bias applied to the control grid of said device.

6. In combination, a modulator tube having an anode, a control electrode, and a cathode, a resistor and a source of anode potential connected in series between said anode and said cathode, the positive terminal of said source being connected to a point of reference potential, an electron discharge device having an anode, a control grid, and a cathode, said control grid being connected to the anode of the modulator tube, the cathode of said device being connected to the positive terminal of said source, increasing anode current flow through said modulator tube causing decreasing anode current flow through said device; the series combination of a diode and a capacitor connected between the grid and cathode of said device, and a circuit for biasing said diode in such a way that said diode becomes conductive with a decrease in the negative bias applied to the control grid of said device.

7. In a television transmitter, a modulator having an input circuit; means for supplying to said input circuit a composite video signal including a varying-level D.C. brightness signal and a subcarrier; a complex output impedance coupled across said modulator by means of a coupling capable of passing direct current, the impedance values of said complex output impedance being selected and arranged such that the phase angle of said impedance at the frequency of said subcarrier varies with variations in the D.C. level of the brightness signal, and means responsive to said D.C. level of the brightness signal for counteracting substantially completely the variations in said phase angle, thereby maintaining said phase angle constant over a wide range of variation of D.C. level of the brightness signal.

8. In a color television transmitter, a modulator having an input circuit; means for supplying to said input circuit a composite video signal including a varying-level D.C. brightness signal and a subcarrier of approximately 3.58 megacycles per second; a complex output impedance coupled across said modulator by means of a coupling capable of passing direct current, the impedance values of said complex output impedance being selected and arranged such that the phase angle of said impedance at the frequency of said subcarrier varies with variations in the D.C. level of the brightness signal, and means responsive to said D.C. level of the brightness signal for counteracting substantially completely the variations in said phase angle, thereby maintaining said phase angle constant over a wide range of variation of D.C. level of the brightness signal.

9. In a transmitter, an electron discharge device modulator having output electrodes; an electron discharge device modulated stage having input electrodes; a connection capable of passing direct current between said output electrodes and said input electrodes, resistive and reactive impedance elements connected between said output electrodes and said input electrodes to provide a complex output impedance for said modulator, a diode connected in series with an impedor across said input electrodes, and means for biasing said diode to conduct only above a predetermined signal level applied to said input electrodes.

10. In a transmitter, an electron discharge device modulator having output electrodes; an electron discharge device modulated stage having input electrodes; a connection capable of passing direct current between said output electrodes and said input electrodes, resistive and reactive impedance elements connected between said output electrodes and said input electrodes to provide a complex output impedance for said modulator, two separate diodes each connected in series with a respective impedor across said input electrodes, and means for biasing said diodes to conduct at different predetermined signal levels applied to said input electrodes.

11. In a transmitter, an electron discharge device modulator having output electrodes; an electron discharge device modulated stage having input electrodes; a connection capable of passing direct current between said output electrodes and said input electrodes, resistive and reactive impedance elements connected between said output electrodes and said input electrodes to provide a complex output impedance for said modulator, a diode connected in series with a reactive impedor across said input electrodes, and means for biasing said diode to conduct only above a predetermined signal level applied to said input electrodes.

12. In a transmitter, an electron discharge device modulator having output electrodes; an electron discharge device modulated stage having input electrodes; a connection capable of passing direct current between said output electrodes and said input electrodes, resistive and reactive impedance elements connected between said output electrodes and said input electrodes to provide a complex output impedance for said modulator, two separate diodes each connected in series with a respective resistive impedor across said input electrodes, and means for biasing said diodes to conduct at different predetermined signal levels applied to said input electrodes.

13. In a transmitter, an electron discharge device modulator having output electrodes; an electron discharge device modulated stage having input electrodes; a connection capable of passing direct current between said output electrodes and said input electrodes, resistive and reactive impedance elements connected between said output electrodes and said input electrodes to provide a complex output impedance for said modulator, two separate diodes each connected in series with a respective reactive impedor across said input electrodes, and means for biasing said diodes to conduct at different predetermined signal levels applied to said input electrodes.

References Cited in the file of this patent

UNITED STATES PATENTS

| | | |
|---|---|---|
| 2,297,612 | Faudell | Sept. 29, 1942 |
| 2,583,345 | Schade | Jan. 22, 1952 |